United States Patent
Felber et al.

(10) Patent No.: US 9,428,045 B2
(45) Date of Patent: Aug. 30, 2016

(54) FILLING DEVICE AND METHOD FOR MANUFACTURING A FILLING DEVICE

(71) Applicant: MAGNA STEYR Fuel Systems GesmbH, Sinabelkirchen (AT)

(72) Inventors: Andreas Felber, Hart-Purgstall (AT); René Hendler, Graz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 0 days.

(21) Appl. No.: 14/668,889

(22) Filed: Mar. 25, 2015

(65) Prior Publication Data

US 2015/0274009 A1    Oct. 1, 2015

(30) Foreign Application Priority Data

Mar. 25, 2014   (EP) ..................... 14161496

(51) Int. Cl.
| | |
|---|---|
| *F16L 9/16* | (2006.01) |
| *B60K 15/04* | (2006.01) |
| *B29C 49/22* | (2006.01) |
| *B29C 49/48* | (2006.01) |
| *B60K 15/035* | (2006.01) |
| *B29K 101/00* | (2006.01) |
| *B29K 105/00* | (2006.01) |
| *B29L 9/00* | (2006.01) |
| *B29L 31/00* | (2006.01) |

(52) U.S. Cl.
CPC ............... *B60K 15/04* (2013.01); *B29C 49/22* (2013.01); *B29C 49/48* (2013.01); *B60K 15/035* (2013.01); *B29C 2049/4871* (2013.01); *B29K 2101/00* (2013.01); *B29K 2105/253* (2013.01); *B29K 2995/0067* (2013.01); *B29L 2009/00* (2013.01); *B29L 2031/7172* (2013.01); *B60K 2015/03538* (2013.01); *B60K 2015/047* (2013.01)

(58) Field of Classification Search
CPC ........ B60K 15/04; B29C 49/22; B29C 49/48
USPC ................ 138/111, 116, 177, 178, DIG. 10, 138/DIG. 11; 428/36.1
See application file for complete search history.

(56) References Cited

U.S. PATENT DOCUMENTS

| | | | | |
|---|---|---|---|---|
| 3,187,936 | A * | 6/1965 | Downing | B60K 15/04 138/111 |
| 4,643,927 | A * | 2/1987 | Luecke | B32B 27/08 138/137 |
| 7,021,343 | B2 * | 4/2006 | Okada | F16L 58/08 141/286 |
| 7,913,719 | B2 * | 3/2011 | Werner | B29C 65/18 138/127 |
| 2003/0070751 | A1 * | 4/2003 | Bergevin | B29C 63/065 156/297 |
| 2004/0040607 | A1 * | 3/2004 | Wilson | B32B 1/08 138/137 |
| 2005/0224135 | A1 | 10/2005 | Okada et al. | |
| 2011/0139804 | A1 * | 6/2011 | Koukan | B60K 15/035 220/746 |
| 2012/0199238 | A1 * | 8/2012 | Tamura | B32B 1/08 138/137 |
| 2013/0186469 | A1 * | 7/2013 | Bourgeois | B32B 7/12 137/1 |

FOREIGN PATENT DOCUMENTS

| | | |
|---|---|---|
| EP | 1136299 A2 | 9/2001 |
| EP | 1845296 A2 | 10/2007 |
| WO | 00/29773 A1 | 5/2000 |

* cited by examiner

*Primary Examiner* — Patrick F Brinson
(74) *Attorney, Agent, or Firm* — Jordan IP Law, LLC; Todd A. Vaughn

(57) ABSTRACT

A filler device to introduce fuel into a motor vehicle tank, and which includes a filler pipe and a vent pipe connected to the filler pipe via a crimp that extends therebetween.

3 Claims, 1 Drawing Sheet

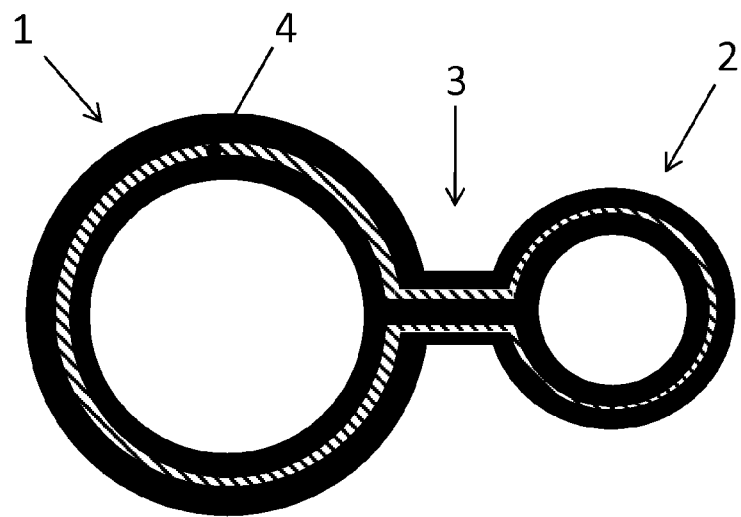

FILLING DEVICE AND METHOD FOR MANUFACTURING A FILLING DEVICE

CROSS-REFERENCE TO RELATED APPLICATIONS

The present application claims priority 35 U.S.C. §119 to European Patent Publication No. EP 14161496.6 (filed on Mar. 25, 2014), which is hereby incorporated by reference in its entirety.

TECHNICAL FIELD

Embodiments relate to a filler device to introduce fuel into a motor vehicle tank, comprising a filler pipe and a vent pipe.

BACKGROUND

Filling a motor vehicle tank via a filler pipe is sufficiently well known. It is likewise already known that a dedicated vent line separate from the filler pipe is used to discharge gases from the motor vehicle tank during refueling.

Thus, for instance, WO 2012/126593 discloses a tank venting device for a motor vehicle having a filler pipe and a vent line. Another vent line is known from German Patent Publication No. DE 10 2012 104 849 A1.

The practice of reducing permeation of gases, especially hydrocarbons, through the walls of a fuel tank by means of a vapour-tight barrier layer is also known, e.g., from German Patent Publication No. DE 10 2005 025 905 A1, as is the practice of reducing permeation through the walls of a filler pipe, e.g., from WO 00/29773.

SUMMARY

In accordance with embodiments, a filler device to introduce fuel into a motor vehicle tank is provided, which is simple and economical to produce and, at the same time, allows a significant reduction in unwanted gas emissions.

In accordance with embodiments, a method for producing a filler device in a simple and economical manner and, at the same time, allows a significant reduction in unwanted gas emissions.

In accordance with embodiments, a filler device to introduce fuel into a motor vehicle tank includes at least one of: a filler pipe and a vent pipe formed integrally with the filler pipe via a connection by a crimp, and a barrier layer for at least one of the filler pipe, and/or the vent pipe, such a barrier layer to prevent an escape of gas, such as, for example, hydrocarbons.

In accordance with embodiments, a vent pipe is embodied integrally with a filler pipe, wherein the vent pipe and the filler pipe are separated from one another in a longitudinal direction thereof only by a crimp in the pipe material, and connected to one another by the crimp. In this way, the filler pipe and the vent pipe may be manufactured at low cost from a single, unitary piece.

In accordance with embodiments, at least one of the filler pipe, and/or the vent pipe, has a barrier layer to reduce the permeation of gases therefrom.

Developments of the invention are given in the dependent claims, the description and the attached drawing.

In accordance with embodiments, the barrier layer may extend through the filler pipe, through the crimp, and through the vent pipe.

In accordance with embodiments, the barrier layer may extend around the entire circumference of the filler device. This is advantageous for significantly reducing gas emissions.

In accordance with embodiments, the vent pipe and the filler pipe may be manufactured from a plastic material.

In accordance with embodiments, the barrier layer may be arranged as a central layer within the plastic. Particularly simple and low-cost production of the filler device is thereby made possible.

In accordance with embodiments, the barrier layer may also be applied to the outer surface of the vent pipe and/or of the filler pipe, especially in the form of a shrink-on sleeve. Preferred materials for the barrier layer are EVOH or PA9, for example.

In accordance with embodiments, a method for producing a filler device includes at least one of: placing a plastic pre-form, such as, for example, a plastic tube or hose having a barrier layer as a central layer, in a double-barreled blow mould, and then moulding the plastic-pre-form by blow moulding by way of a pair of blowing pins. The barrier layer may also be applied externally, e.g., as a shrink-on sleeve.

In accordance with embodiments, a filler device to introduce fuel into a motor vehicle tank includes at least one of: a filler pipe; a vent pipe; a crimp to connect the vent pipe to the filler pipe; and a barrier layer to prevent an outflow of gas from the filler device.

In accordance with embodiments, a filler device to introduce fuel into a motor vehicle tank includes at least one of: a filler pipe; a vent pipe spaced from the filler pipe and connected thereto via a second end of the crimp; a crimp extending between and connected to the filler pipe and the vent pipe; and a barrier layer for the filler pipe, the vent pipe and the crimp to prevent an outflow of gas from the filler device In accordance with embodiments, a method for producing a filler device includes at least one of: placing a pre-form material having a barrier layer in a double-barreled blow mould; and blow moulding the pre-form material via a pair of blowing pins to form a filler pipe and a vent pipe connected via a crimp.

DRAWINGS

Embodiments will be illustrated by way of example in the drawing and explained in the description hereinbelow.

FIG. 1 illustrates, in a sectional view transversely to the longitudinal axis, of a filler device, in accordance with embodiments.

DESCRIPTION

As illustrated in FIG. 1, a filler device in accordance with the invention. The filler device comprises a filler pipe 1 and a vent pipe 2. The filler pipe 1 and the vent pipe 2 may both be produced from plastic and from a single pre-form. The filler pipe 1 and the vent pipe 2 are separated by a crimp 3 that extends therebetween. A common barrier layer 4 to reduce an outward flow of gas through the walls of the filler device extends within the plastic and centrally around the filler pipe 1, the crimp 3 and the vent pipe 2.

The filler device may be produced in a simple manner by ways of blow moulding. The method includes placing a common plastic sleeve already including a barrier layer centrally in the plastic wall in a double-barreled blow mould. Next, moulding the twin-tube form of the filler device by blow moulding by way of a pair of blowing pins.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 filler pipe
2 vent pipe
3 crimp
4 barrier layer

What is claimed is:

1. A filler device to introduce fuel into a motor vehicle tank, the filler device comprising:
   a filler pipe composed of plastic;
   a vent pipe composed of plastic;
   a crimp to connect the vent pipe to the filler pipe; and
   a barrier layer extending centrally through the filler pipe, the crimp, and the vent pipe to prevent an outflow of gas from the filler device.

2. A filler device to introduce fuel into a motor vehicle tank, the filler device comprising:
   a filler pipe composed of plastic;
   a vent pipe composed of plastic, and which is spaced from the filler pipe;
   a crimp extending between and connected to the filler pipe and the vent pipe; and
   an internal barrier layer extending centrally through the filler pipe, the vent pipe and the crimp to prevent an outflow of gas from the filler device.

3. The filler device of claim 2, wherein the barrier layer comprises a central layer arranged within the plastic.

* * * * *